Aug. 8, 1967   A. ALBISSER   3,335,334
LIQUID LEVEL SENSING DEVICE
Filed Dec. 9, 1963   2 Sheets-Sheet 1

Inventor
Albert Albisser
By Stevens, Davis, Miller + Mosher
Attorneys

Inventor
Albert Albisser
By Stevens, Davis, Miller & Mosher
Attorneys 3,335,334
LIQUID LEVEL SENSING DEVICE
Albert Albisser, Boucherville, Quebec, Canada, assignor to Molson Breweries Limited, Montreal, Quebec, Canada
Filed Dec. 9, 1963, Ser. No. 328,966
Claims priority, application Canada, July 8, 1963, 879,632
1 Claim. (Cl. 317—153)

This invention relates to an apparatus and a method for detecting the level of fluids or the interface between two fluids. More particularly, it is intended for use with liquids susceptible to foaming, to ascertain the interface between the liquid and the foam.

Previous known instruments, particularly of the buoyancy type, were prone to errors where the associated detectors were partially or fully immersed in foam. In some known instruments the electrical conductivity of the liquid has been used to detect, often with the aid of a bridge circuit, the absence or presence of a liquid. Such circuits have been utilized to sound an alarm in the absence of a liquid, for example, in steam boilers. Similarly, such circuits have been adapted to provide quantitative measurement. Other types of instruments have utilized electro-acoustic transducers whose impedance changes with the absence or presence of liquid. Thermistors have been used wherein a thermistor has been heated and the absence or presence of liquid has changed the amount of heat radiated from the thermistor. Other systems have relied on oscillator circuits, wherein mutual conductance of coils has been changed by the absence or presence of liquids. All these known instruments comprised two conflicting criteria. Firstly, where high resolving power has been necessary, instability has required frequent recalibration and in the case of capacitive techniques, long cables have introduced undesirable variables susceptible to humidity and mechanical influences. Secondly, where information from the sensing device has needed to be transmitted over considerable distances, as would be found inside industrial plants, low accuracy has experienced. There has existed the need for a liquid level sensing device having such a sensitivity that the presence of foam at the surface of the liquid will not influence the sensing of the true liquid level, but at the same time, having properties enabling the transmission, of such sensing, over relatively long distances. The invention fulfills this latter requirement and has particular utility in the beer producing industry.

A primary feature of this invention is the provision of a liquid level sensing device particularly for use with foamed liquids.

A further feature of this invention is a liquid level sensing device with a minimum of parts and of low cost.

A further feature of this invention is a liquid level sensing device operable over a wide range of distances between an associated sensing probe and its relay device.

A still further feature of this invention is a liquid level sensing device having rapid response, high accuracy, positive action, and further having a sensitivity sufficiently low to disregard the presence of foam above the liquid.

A still further feature of this invention is a method of sensing the true level of liquid in a container when the said liquid is capped by a quantity of foam sufficient to cause erroneous indications of liquid levels with prior known types of instruments.

By a broad aspect of the present invention there is provided a liquid level sensing device, particularly for use with foamed liquids but also utilizable to detect the interface between any two fluids of different electrical resistivity, including a simple probe adapted to be placed in the liquid whose level is to be sensed, the probe usually consisting of a pair of insulated wires, each with a short length of insulation removed, so that the bared ends of the said pair of wires are placed at the liquid, for example, at the interface between the surfaces of the true liquid and the foamed liquid, and bridge circuit adapted to produce an output which is dependent on the resistance due to the presence or absence of true liquid between the two probe wires, the output being adapted to provide a control voltage for switching means so that the switching means is adapted to have only two discrete states distinguished by an "on" condition and "off" condition. The present invention also provides a method of sensing an interface between two fluids of different resistive characteristics, for example, the detecting of the true level of liquid in a container having both true liquid and a quantity of foamed liquid in contact with and on top of the true liquid, wherein the presence of one fluid, i.e., the true liquid in contact with a pair of wires in a sensing probe causes a relay to cut out, and wherein the presence of the other fluid, i.e., the foamed-liquid or air causes the same relay to cut-in. The absence or presence of the true liquid is further caused to control an associated external circuit.

Figure 1:
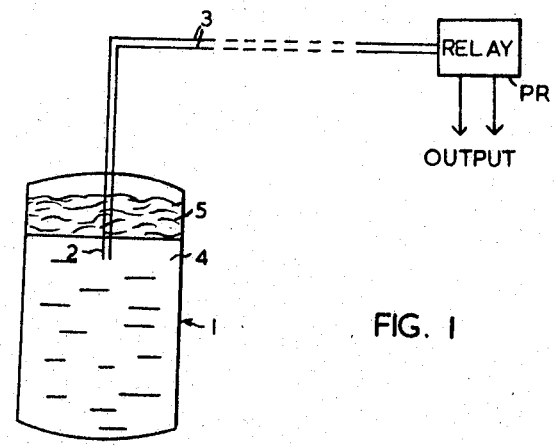
FIG. 1 is a diagrammatic arrangement of a liquid container having associated therewith a sensing device constructed in accordance with the present invention.
Figure 2:
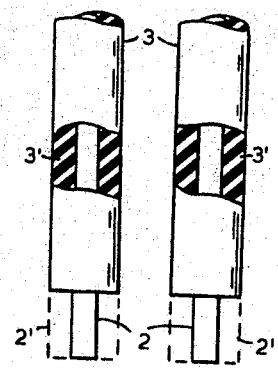
FIG. 2 is an enlarged view of the two conductors forming the sensing probe.

FIG. 1 shows diagrammatically a liquid container 1, containing a liquid 4, having a quantity of foamed liquid 5 on the upper surface thereof. In order to sense the level of the surface of the liquid, a probe 2 is positioned within the container. In the embodiment shown in FIG. 2, the sensing probe is simply made, for example, by stripping off portions 2′ about ¼ inch in length, of insulation 3′ from the conductors 3. If necessary, the exposed ends of the conductors may be made of platinum, or other suitable metal, if corrosion is probable.

The exposed ends of the conductors 3, forming the probe 2, may be rigidly held apart by any suitable means, and the said ends are adapted to sense the presence or absence of true liquid, between them, by means of the change of electrical resistance of the liquid or absence of liquid between the ends. Since liquids, foamed liquids and air have different electrical resistivity, the change of resistivity provides the independent variable in a bridge circuit, in an associated relay PR to be described hereinafter.

The associated relay may be adjacent the sensing probe or container or, alternatively, the relay may be located at some distant site. The system may be used merely to indicate that a desired level of liquid has been achieved or, alternatively, the output of the relay may be used to control valves etc., in a programming or remote control requirement.

Figure 3:
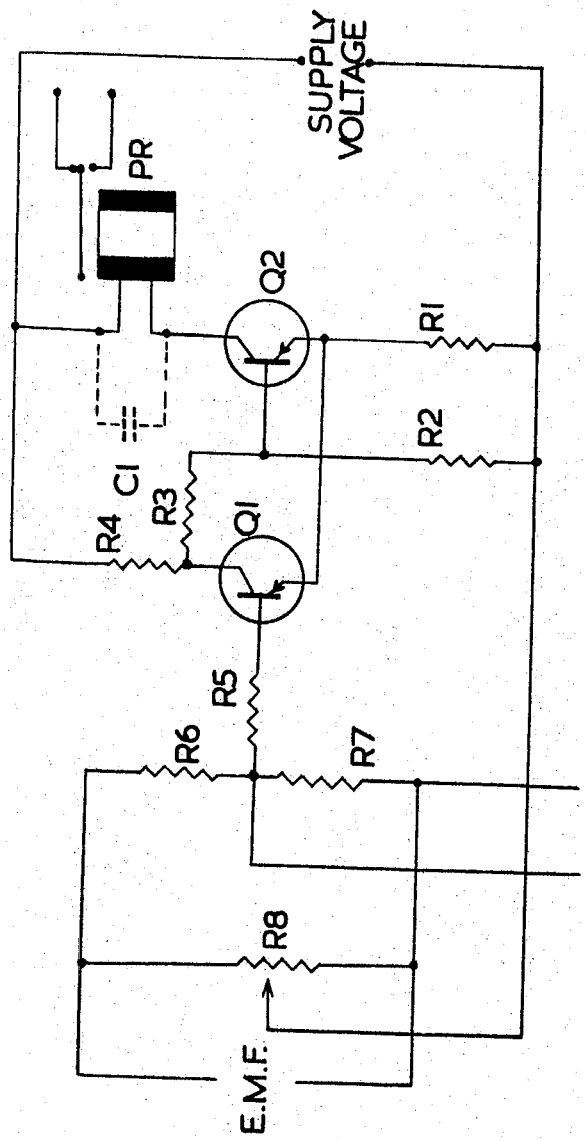
FIG. 3 shows one embodiment of the circuit diagram of a relay system of the present invention.

In FIG. 3, a bridge network is formed by resistances $R_6$, $R_7$ and the respective portions of potentiometer $R_8$ each side of the wiper contact. The two conductors 3 forming the probe 2 are placed in parallel with resistance $R_7$ and by this means when the bridge is energized, an output is provided, between the wiper contact on resistance $R_8$ and the junction of the resistances $R_6$ and $R_7$, which output is a function of the resistance changes experienced by the probe 2. A suitable E.M.F. applied across $R_8$, as shown, energizes the bridge. In order to obtain comparative insensitivity to small changes in resistance, experienced by the probe, the output of the bridge is connected to the base of a switching transistor $Q_1$ through a resistance $R_5$ which sets the necessary base voltage.

The output of transistor $Q_1$ is used for controlling the base voltage on a second transistor $Q_2$ obtained through resistance $R_4$ and a potential divider formed by resistances $R_3$ and $R_4$. The voltage, thus controlled, is derived from a suitable supply voltage, applied as indicated. For convenience, the emitters of both of said transistors, $Q_1$ and $Q_2$, are held at the same voltage by a common emitter resistance $R_1$.

Transistor $Q_2$, in turn, controls the current through the relay, indicated PR, which is also connected to the same supply voltage.

The position of the potentiometer $R_8$ is adjusted so that the bridge circuit is balanced or just unbalanced with the probe clear of the true liquid. According to which of the abovementioned conditions is chosen the bridge circuit will cause transistor $Q_1$, and hence transistor $Q_2$, to change from a first condition to a second condition, when the probe is immersed in true liquid, or not immersed in true liquid.

It will be appreciated that the output of the bridge, as detected through $R_5$, itself would provide a proper indication not only of the presence of liquid but also of the total depth of immersion assuming the exposed portions of the probes are of sufficient length and that the output of the bridge is suitably related to the electrical resistivity of the liquid used. This technique is well known in the prior art as hereinbefore discussed. However, at this point, the circuit is incapable of discerning whether the net resistance across the probe is due to a relatively small amount of liquid or of a large amount of foam having substantially the same net electrical resistivity. The inclusion of a probe having wires, the exposed ends of which are of short length, and the transistor $Q_1$ reduces the resolving power to such an extent that the transistor $Q_1$ changes from a conducting condition to a non-conducting condition or vice-versa, when the probe changes from a very slightly immersed to a non-immersed condition or vice-versa. On account of this important feature of this invention, the exposed portions of the wires need in fact, be only one or two millimetres in length. Similarly, the low resolving power of the liquid level sensing device of this invention permits the use of long connections between the probe per se and the associated relay circuit. The initial calibration of the bridge will automatically allow for the resistance of the connecting wires between the probe and the relay circuit. Where temperature compensation is desired, a third-lead may be taken to the probe, using a technique well known in thermoelectric pyrometry, as will be obvious to those skilled in the art.

The relay coil of the relay PR, on FIG. 3, may of course be placed in series with resistances shown at $R_2$ and $R_3$. This will only result in restricting the current available for operating the relay, since the capacity of transistor $Q_1$, is preferably kept small so as to restrict the bridge currents to a minimum. High bridge currents are to be avoided if the effects of long leads, forming the connections between the ends 2' and the relay, are to be minimized. The inclusion of transistor $Q_2$ permits the use of such low bridge currents but without restricting the current available for operating the relay, which in some applications may be used to control flow controls etc.

In the embodiment illustrated hereinbefore, the E.M.F., used for the bridge, was 9 volts D.C. but A.C. of any voltage, suitable for the bridge and transistor $Q_1$, may be used, the values of the various resistances being selected accordingly. Similarly, the supply used was 24 v. D.C., but this could be A.C. of any suitable value providing of course that a capacitance shown dotted at $C_1$ is included to prevent contact chattering.

The contacts of the relay PR shown are of the single-pole, double-throw type, but any suitable alternative, provided by conventional relays, may be utilized for particular installations.

As disclosed hereinbefore, the probe may be made by stripping off short lengths of insulation from lengths of insulated conductors. The bared ends may be suitably mounted to be exposed at the desired surface level of the true liquid. Alternatively, the bared ends may be mounted to provide for variable positions for the levels of the true liquid.

In the embodiment hereinbefore described, by way of example, the values of the elements used in the circuit shown in FIG. 3 are as follows:

|  | Ohms |
|---|---|
| $R_1$ | 470 |
| $R_2$ | 12,000 |
| $R_3$ | 15,000 |
| $R_4$ | 5,000 |
| $R_5$ | 4,700 |
| $R_6$, $R_7$ | 3,900 |
| $R_8$ | 100,000 |
| Relay PR | 2,500 |

Transistors $Q_1$, $Q_2$, PNP type.

The fixed sensing probe and associated relay device hereinbefore described may be used simply to sense the level of liquid in a container having both liquid and foamed liquid therewithin. Alternatively, a plurality of fixed units, may be used to sense (1) a completely empty container, (2) a completely full container or, (3) a container with any number of descrete levels of liquid therein. Alternatively again, a single probe may be mounted for movement in a vertical plane whereby the associated relay will indicate when the liquid is at the level of the probe, and the physical position of the probe used to perform control functions or other indications required.

I claim:

A liquid level sensing device comprising:
  (i) a probe having a pair of insulated conductors rigidly spaced apart at one pair of adjacent ends thereof, each of said conductors having a short portion of insulation removed therefrom at said one pair of adjacent ends, said one pair of adjacent ends being coterminous and positioned at the surface of a true liquid, said conductors being exposed throughout their lower portions and at the other pair of adjacent ends thereof exhibiting an electrical resistance indicative of the absence or presence of true liquid between said conductors at said one pair of adjacent ends,
  (ii) a closed bridge circuit, having a source of E.M.F. applied thereto, and said conductors being connected across one bridge arm at the other pair of adjacent ends thereof, said bridge having a first state of balance when said probe is in contact with true liquid and having a second state of balance when said probe is out of contact with said true liquid, said bridge having means for adjusting an initial state of balance and an output which is indicative of said first and second states of balance,
  (iii) a first transistor connected through a coupling resistance, and responsive to said output from said bridge, said first transistor having resistances connected to its collector and emitter to place said first transistor within its operating range, said first transistor being adapted to be triggered only under the following two conditions:
    (1) when said bridge circuit changes from a balanced condition to an unbalanced condition, and
    (2) when said bridge circuit changes from an unbalanced condition to a balanced condition, (iv) a second transistor having its base connected through a coupling potentiometer, and responsive to the collector voltage of said first transistor, said second transistor sharing the emitter resistance of said first transistor,
(v) a relay in the circuit of, and controlled by, said second transistor, and
(vi) a voltage supply for energising said first and second transistors and said relay.

References Cited

UNITED STATES PATENTS

| | | | |
|---|---|---|---|
| 2,659,068 | 11/1953 | Erickson et al. | 73—304 |
| 2,792,566 | 5/1957 | Shanhouse et al. | 340—244 |
| 3,150,311 | 9/1964 | Jones et al. | 340—233 |

LOUIS R. PRINCE, *Primary Examiner.*

S. C. SWISHER, *Assistant Examiner.*